(12) United States Patent
Chang

(10) Patent No.: US 7,417,399 B2
(45) Date of Patent: Aug. 26, 2008

(54) INTEGRATED MOTOR DEVICE AND METHOD OF SETTING AND READING DRIVER CONFIGURATION PARAMETERS USING DRIVER CONFIGURATION DATA EMBEDDED IN DRIVER CONTROL SIGNALS

(75) Inventor: Christopher C. Chang, Brentwood, CA (US)

(73) Assignee: Arcus Technology, Inc, Fremont, CA (US)

( * ) Notice: Subject to any disclaimer, the term of this patent is extended or adjusted under 35 U.S.C. 154(b) by 0 days.

(21) Appl. No.: 11/525,650

(22) Filed: Sep. 21, 2006

(65) Prior Publication Data

US 2008/0075438 A1  Mar. 27, 2008

(51) Int. Cl.
G05B 13/02 (2006.01)
G05B 11/01 (2006.01)

(52) U.S. Cl. .......................... 318/561; 700/47

(58) Field of Classification Search ................. 318/560, 318/561, 434, 471, 472; 388/934; 700/28, 700/44, 45, 47, 67, 73, 83, 86, 89
See application file for complete search history.

(56) References Cited

U.S. PATENT DOCUMENTS

| 3,959,776 | A  | * | 5/1976 | Morley ........................ 358/1.1 |
| 6,697,685 | B1 | * | 2/2004 | Caldwell ...................... 700/71 |
| 6,759,822 | B2 | * | 7/2004 | Marusarz ..................... 318/268 |
| 7,194,321 | B2 | * | 3/2007 | Sun et al. ...................... 700/61 |

* cited by examiner

*Primary Examiner*—Bentsu Ro
(74) *Attorney, Agent, or Firm*—Thomas H. Ham; Wilson & Ham

(57) ABSTRACT

An integrated motor device with driver circuitry and method of setting and reading configuration parameters of the driver circuitry uses configuration data embedded in driver control signals to set at least one configuration parameter of the driver circuitry.

16 Claims, 3 Drawing Sheets

INTEGRATED MOTOR DEVICE AND METHOD OF SETTING AND READING DRIVER CONFIGURATION PARAMETERS USING DRIVER CONFIGURATION DATA EMBEDDED IN DRIVER CONTROL SIGNALS

BACKGROUND OF THE INVENTION

Some conventional stepper motors and digital servo motors are integrated with motor driver circuitry, which provides driving signals to the connected motor. The driver circuitry of these conventional integrated motors is controlled using digital control signals from an external controller. Thus, conventional integrated motors include input/output (I/O) pins to receive digital control signals from the controller. As an example, the digital control signals may include an enable signal, a direction signal and a pulse signal.

The driver circuitry of these conventional integrated motors is usually designed such that configuration parameters or values of the driver circuitry can be set or changed with respect to, for example, maximum current, microstep, gains and directional polarity. These configuration parameters of the driver circuitry are typically set using one of two methods. The first method involves the use of mechanical control devices, such as dip switches, jumpers, mechanical switches and potentiometers, which are electrically connected to the driver circuitry. The second method involves the use of a computer, which is connected to the driver circuitry via a serial communication connection, such as RS-232, Universal Serial Bus (USB), Ethernet or Serial Peripheral Interface Bus (SPI).

A concern with the first method for setting the configuration parameters of the driver circuitry is that access to the mechanical control devices to set the configuration parameters may be difficult. The mechanical control devices and the driver circuitry are usually situated in the housing of an integrated motor. Thus, one or more sections of the motor housing may have to be removed to access the mechanical control devices.

A concern with the second method for setting the configuration parameters of the driver circuitry is that this method requires a serial communication port and related communication components to receive and transmit data with a computer, which can increase the manufacturing cost of the integrated motor.

Therefore, there is a need for an integrated motor device with driver circuitry and method of setting configuration parameters of the driver circuitry, which can alleviate the above-described concerns.

SUMMARY OF THE INVENTION

An integrated motor device with driver circuitry and method of setting and reading configuration parameters of the driver circuitry uses configuration data embedded in driver control signals to set at least one configuration parameter of the driver circuitry. Consequently, the integrated motor device does not require mechanical control devices, such as dip switches, jumpers, mechanical switches or potentiometers, to set the configuration parameters of the driver circuitry. The integrated motor device also does not require a serial communication port and related communication components to receive and transmit data with a computer to set the configuration parameters of the driver circuitry. As a result, the manufacturing cost of the integrated motor device can be significantly decreased.

An integrated motor device in accordance with an embodiment of the invention comprises a motor, driver circuitry and a processor. The driver circuitry is connected to the motor to control the motor. The driver circuitry is configurable with respect to driver configuration parameters. The processor is connected to receive driver control signals with embedded driver configuration data. The processor is configured to detect and extract the embedded driver configuration data in the driver control signals to produce a driver configuration signal using the embedded driver configuration data. The processor is connected to the driver circuitry to transmit the driver configuration signal to the driver circuitry to set at least one of the driver configuration parameters.

A method of setting configuration parameters of driver circuitry of an integrated motor device in accordance with an embodiment of the invention comprises receiving driver control signals with embedded driver configuration data, detecting the embedded driver configuration data within the driver control signals, extracting the embedded driver configuration data from the driver control signals to produce a driver configuration signal, and transmitting the driver configuration signal to the driver circuitry to set at least one configuration parameter of the driver circuitry.

Other aspects and advantages of the present invention will become apparent from the following detailed description, taken in conjunction with the accompanying drawings, illustrated by way of example of the principles of the invention.

DETAILED DESCRIPTION

Figure 1:
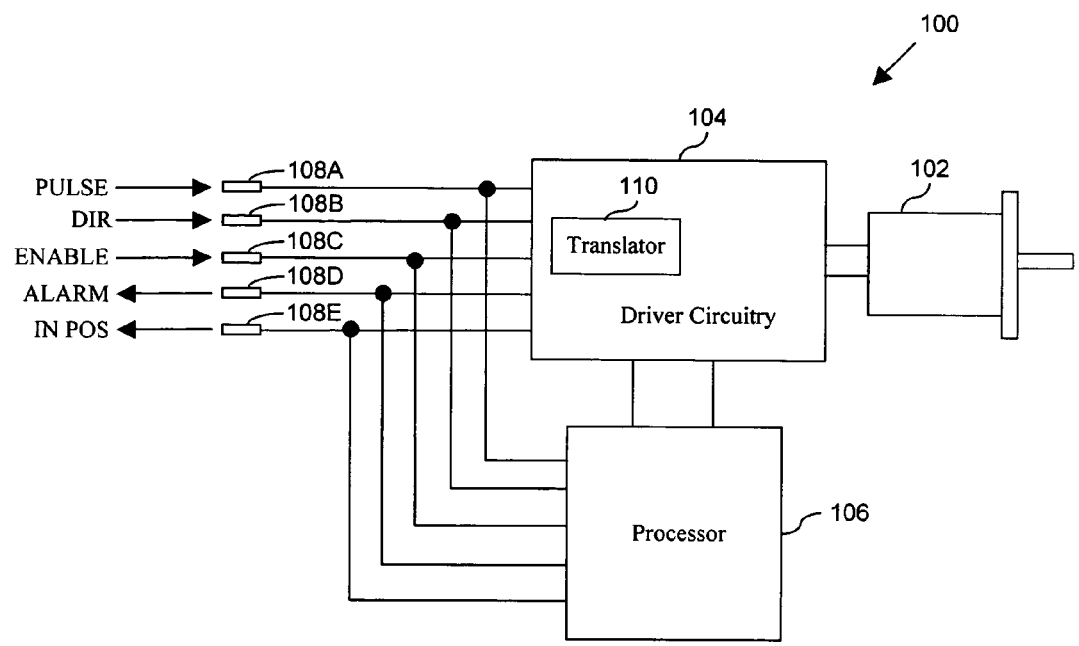
FIG. 1 is a block diagram of an integrated motor device with driver circuitry in accordance with an embodiment of the invention.

With reference to FIG. 1, an integrated motor device 100 in accordance with an embodiment of the invention is described. Similar to other conventional integrated motor devices, the integrated motor device 100 includes both a motor 102 and driver circuitry 104. However, as described in more detail below, the integrated motor device 100 is designed such that digital driver control signals, which are used exclusively to control the driver circuitry and to provide status of the driver circuitry in conventional integrated motor devices, are also used to set or change configuration parameters or values of the driver circuitry 104, as well as to provide current configuration settings of the driver circuitry. Thus, the integrated motor device 100 does not require mechanical control devices, such as dip switches, jumpers, mechanical switches or potentiometers, to set the configuration parameters of the driver circuitry 104. The integrated motor device 100 also does not require a serial communication port and related communication components to receive and transmit data with a computer to set the configuration parameters of the driver circuitry 104. As a result, the manufacturing cost of the integrated motor device 100 can be significantly decreased.

As shown in FIG. 1, the integrated motor device 100 includes the motor 102, the driver circuitry 104, a processor 106 and input/output (I/O) pins or terminals 108A-108E. The motor 102 can be any type of an electrical motor. As an example, the motor 102 may be a stepper motor or a digital servo motor. The motor 102 is electrically connected to the driver circuitry 104, which provides driving signals to the motor.

The driver circuitry 104 is configured to be controlled by input digital control signals that are transmitted to the driver circuitry from an external controller (not shown). In this embodiment, the input digital control signals used to control the driver circuitry 104 include an enable signal, a direction signal and a pulse signal. However, in other embodiments, the driver circuitry 104 may be configured to be controlled by other input digital control signals. The driver circuitry 104 is also configured to transmit output digital control signals to the external controller. In this embodiment, the output digital control signals include an alarm signal and an in-position signal. The alarm signal may indicate that the integrated motor device 100 is too hot, that the over current is detected and/or that position error is detected. In other embodiments, the driver circuitry 104 may be configured to transmit other output digital control signals. Thus, as used herein, control signals include incoming signals to control the driver circuitry 104, as well as outgoing signals to provide status of the integrated motor device 100.

As illustrated in FIG. 1, the driver circuitry 104 is electrically connected to the I/O pins 108A-108E. The I/O pins 108a-108e include a PULSE pin 108A, a DIR pin 108B, an ENABLE pin 108C, an ALARM pin 108D and an IN POS pin 108E. The PULSE, DIR and ENABLE pins 108A, 108B and 108C are used to receive the pulse, direction and enable signals, respectively, from the external controller. The ALARM pin 108D and the IN POS pin 108E are used to transmit the alarm and in-position signals, respectively, to the external controller. In other embodiments in which the drive circuitry 104 uses additional digital control signals, the integrated motor device 100 may include additional I/O pins.

In this embodiment, the driver circuitry 104 includes a translator 110, which translates the received digital control signals to produce the appropriate driving signals to control the motor 102. Driver translators are well known, and thus, the translator 110 of the driver circuitry 104 is not described herein in detail.

The driver circuitry 104 is configurable with respect to configuration parameters. These driver configuration parameters may include microstep setting, maximum current setting, gain settings, polarity setting with respect to direction and other common settings for motor driver circuitry. The driver configuration parameters of the driver circuitry 104 can be set or changed using one or more driver configuration signals, which are transmitted to the driver circuitry 104 from the processor 106 during a driver configuration mode.

Unlike conventional integrated motor devices in which configuration parameters of driver circuitry are set using mechanical control devices or an external computer connected to the driver circuitry, the integrated motor device 100 uses the same digital control signals, which are applied to the I/O pins 108A-108C, to input driver configuration signals into the driver circuitry 104. During a driver configuration mode, at least one of the digital control signals is embedded with driver configuration data, which is detected and extracted to set the configuration parameters of the driver circuitry 104. Thus, the digital control signals are used both to control the driver circuitry 104 and to set the configuration parameters of the driver circuitry. This dual function of the digital control signals eliminates the need for mechanical control devices, such as dip switches, jumpers, mechanical switches or potentiometers, or a serial communication port and related communication components to set the configuration parameters of the driver circuitry 104.

The processor 106 is configured or programmed to monitor the digital control signals to extract the embedded driver configuration data in the digital control signals. The processor 106 is also configured or programmed to produce one or more driver configuration signals in the format suitable for the driver circuitry 104 using the extracted driver configuration data in the digital control signal. In this embodiment, the processor 106 includes non-volatile storage memory, where a computer program and data related to extraction of embedded driver configuration data in the digital control signals and generation of driver configuration signals are stored. In an embodiment, the processor 106 may be a low cost central processing unit (CPU) with built-in non-volatile storage memory with low I/O count.

As illustrated in FIG. 1, the processor 106 is electrically connected to some of the I/O pins 108A-108E to monitor some of the digital control signals transmitted to the integrated motor device 100 from the external controller. In this embodiment, the processor 106 is electrically connected to the PULSE, DIR and ENABLE pins 108A, 108B and 108C. Consequently, in this embodiment, the pulse, direction and enable signals applied to the PULSE, DIR and ENABLE pins 108A, 108B and 108C, respectively, are transmitted to the processor 106, as well as the driver circuitry 104. Thus, the processor 106 is able to monitor the pulse, direction and enable signals received by the integrated motor device 100. The processor 106 is configured or programmed to monitor these digital control signals to detect certain conditions, which indicate that driver configuration data is embedded in the digital control signals. The processor 106 then extracts the embedded driver configuration data from the digital control signals and processes the configuration data to produce one or more corresponding driver configuration signals, which are transmitted to the driver circuitry 104 to set the driver configuration parameters to the desired settings or values, as defined by the embedded driver configuration data. As shown in FIG. 1, the processor 106 may also be electrically connected to the ALARM and IN POS pins 108D and 108E to transmit acknowledgement signals to the external controller through one or both of these pins.

Figure 3:
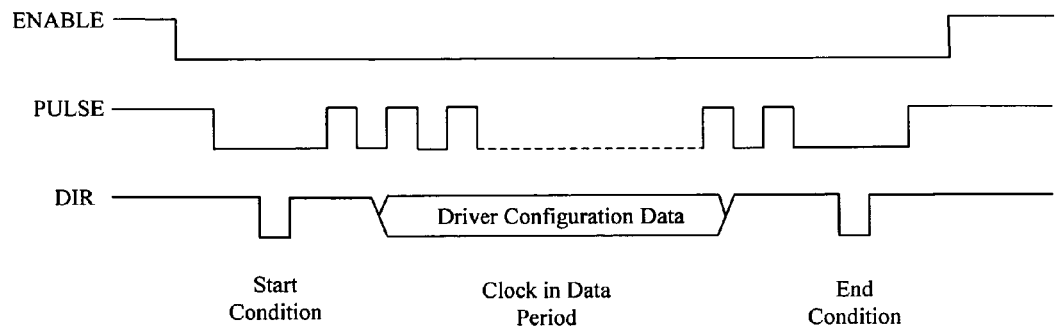
FIG. 3 is a diagram showing examples of enable, pulse and direction signals with embedded driver configuration data to set configuration parameters of the driver circuitry in accordance with an embodiment of the invention.

An example of digital driver control signals to clock in driver configuration data in accordance with an embodiment of the invention is described with reference to FIG. 3. In this example, the pulse, direction and enable signals applied to the PULSE, DIR and ENABLE pins 108A, 108B and 108C, respectively, are used to clock in the driver configuration data, which is embedded in the direction signal. First, the enable signal is turned off to the disable state so that power is not supplied to the motor 102. Then, the pulse and direction signals are modulated in certain predefined manner to indicate a start condition, a clock in data period and an end condition.

The start condition is set by (1) a falling edge of the pulse signal while the direction signal is high, (2) a falling edge of the direction signal while the pulse signal is low, (3) a rising edge of the direction signal while the pulse signal is low, and (4) a rising edge of the pulse signal while the direction signal is high.

Once the start condition is met, the driver configuration data embedded in the direction signal is clocked in at the next rising edge of the pulse signal, which is the beginning of the clock in data period. During this clock in data period, all the data bits of the embedded driver configuration data in the direction signal are clocked in. After all the data bits of the embedded driver configuration data are clock in, the end condition is set.

The end condition is set by (1) a falling edge of the pulse signal while the direction signal is high, (2) a falling edge of the direction signal while the pulse signal is low, (3) a rising edge of the direction signal while the pulse signal is low, and (4) a rising edge of the pulse signal while the direction signal is high. Thus, in this embodiment, the end condition is identical to the start condition. However, in other embodiments, the end condition may be different than the start condition. In fact, in other embodiments, the start and end conditions can be set using different modulation sequences of the pulse and direction signals.

Using the above conditions with respect to the pulse, direction and enable signals, the processor 106 is able to detect and extract the embedded driver configuration data in the direction signal. The extracted driver configuration data can then be used by the processor 106 to produce one or more driver configuration signals, which are used to set the driver circuitry 104 to the desired configuration parameters. The processor 106 is also able to send acknowledgement signals to the external controller using alarm and/or in-position signals as the processor receives the pulse, direction and enable signals. As an example, the processor 106 may send acknowledgement signals after the start and end conditions, as well as after all of the driver configuration data has been received.

The processor 106 is also configured or programmed to generate output digital control signals, which are transmitted to the external controller, to provide current configuration settings of the driver circuitry 104. Thus, the external controller is able to read the current configuration settings of the driver circuitry 104 using digital control signals from the processor 106. In operation, the processor 106 produces output digital control signals with embedded driver configuration setting data in response to a request from the external controller. The output digital signals are transmitted to the external controller via some of the pins 108A-108E. The embedded driver configuration setting data includes information with respect to the current configuration settings of the driver circuitry 104.

Figure 4:
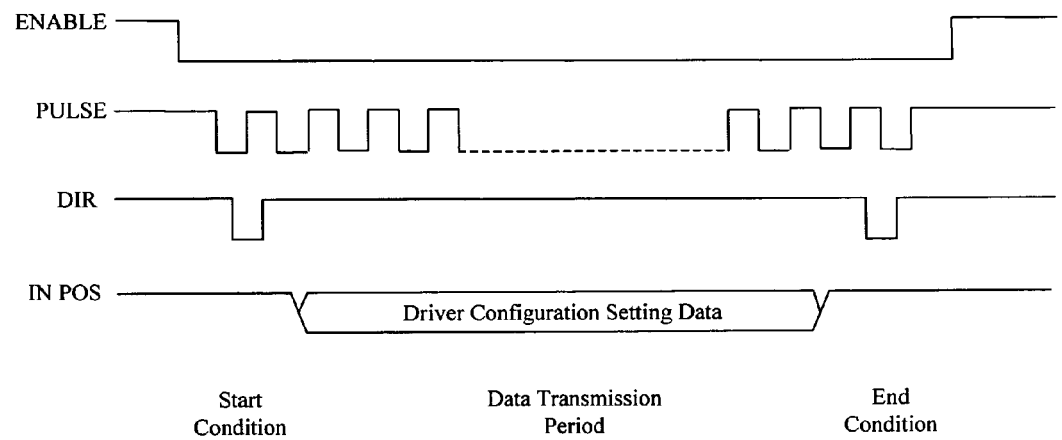
FIG. 4 is a diagram showing examples of enable, pulse, direction and in-position signals with embedded driver configuration setting data to provide current configuration settings of the driver circuitry in accordance with an embodiment of the invention.

An example of digital driver control signals to transmit information regarding the current configuration settings of the driver circuitry 104 in accordance with an embodiment of the invention is described with reference to FIG. 4. In this example, the pulse, direction, enable and in-position signals applied to the PULSE, DIR, ENABLE and IN POS pins 108A, 108B, 108C and 108E, respectively, are used to transmit driver configuration setting data, which is embedded in the in-position signal. First, the enable signal is turned off to the disable state so that power is not supplied to the motor 102. Then, the pulse and direction signals are modulated in certain predefined manner to indicate a start condition and an end condition for the transmission of the embedded driver configuration setting data.

The start condition is set by (1) a falling edge of the pulse signal while the direction signal is high, (2) a falling edge of the direction signal while the pulse signal is low, (3) a rising edge of the pulse signal while the direction signal is low, and (4) a rising edge of the direction signal while the pulse signal is high.

Once the start condition is met, the driver configuration setting data embedded in the in-position signal is transmitted at the next rising edge of the pulse signal, which is the beginning of the data transmission period. During this data transmission period, all the data bits of the embedded driver configuration setting data in the in-position signal are transmitted. After all the data bits of the embedded driver configuration data are transmitted, the end condition is set.

The end condition is set by (1) a falling edge of the direction signal while the pulse signal is high, (2) a falling edge of the pulse signal while the direction signal is low, (3) a rising edge of the direction signal while the pulse signal is low, and (4) a rising edge of the pulse signal while the direction signal is high.

Using the above conditions with respect to the pulse, direction, enable and in-position signals, the processor 106 is able to transmit driver configuration setting data embedded in the in-position signal to the external controller. In an alternative embodiment, the driver configuration setting data may be embedded in another digital control signal, such as the alarm signal.

The integrated motor device 100 may include other components commonly found in conventional integrated motor devices, such as an encoder. However, these common components are not described herein so as to not obscure the inventive features of the integrated motor device 100.

Figure 2:
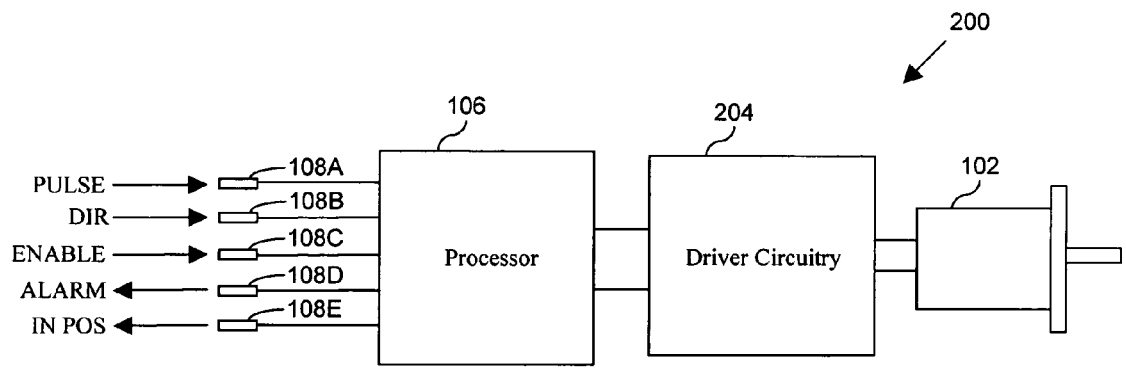
FIG. 2 a block diagram of an integrated motor device with driver circuitry in accordance with another embodiment of the invention.

Turning now to FIG. 2, an integrated motor device 200 in accordance with another embodiment of the invention is shown. The integrated motor device 200 is similar to the integrated motor device 100 of FIG. 1. Thus, the reference numbers used in FIG. 1 are used in FIG. 2 to indicate similar elements. As shown in FIG. 2, the integrated motor device 200 includes the motor 102, a driver circuitry 204, the processor 106 and the I/O pins 108A-108E. In this embodiment, the driver circuitry 204 is not directly connected to the I/O pins 108A-108E. Rather, the driver circuitry 204 is connected to the processor 106, which is exclusively connected to the I/O pins 108A-108E. Thus, in this embodiment, the digital driver control signals received at the I/O pins 108A-108C are transmitted only to the processor 106, which processes the received digital control signals to transmit either driver control signals or one or more driver configuration signals, if driver configuration data is detected and extracted, to the driver circuitry 204.

In this embodiment, the processor 106 is configured to perform the functions of a driver translator, which were performed in the integrated motor device 100 by the translator 110 of the driver circuitry 104. Thus, in this embodiment, the driver circuitry 204 does not include a translator. Consequently, during normal operations, the processor 106 receives the digital control signals and controls the driver circuitry 204 according to the received digital control signals. During a configuration mode, the processor 106 extracts the embedded configuration data in the digital control signals and provides one or more driver configuration signal to the driver circuitry 204 to set the driver circuitry to the desired configuration parameters. During a reading mode, the processor 106 transmits output digital control signals with embedded driver configuration setting data to provide current configuration settings of the driver circuitry 204 to the external controller.

Figure 5:
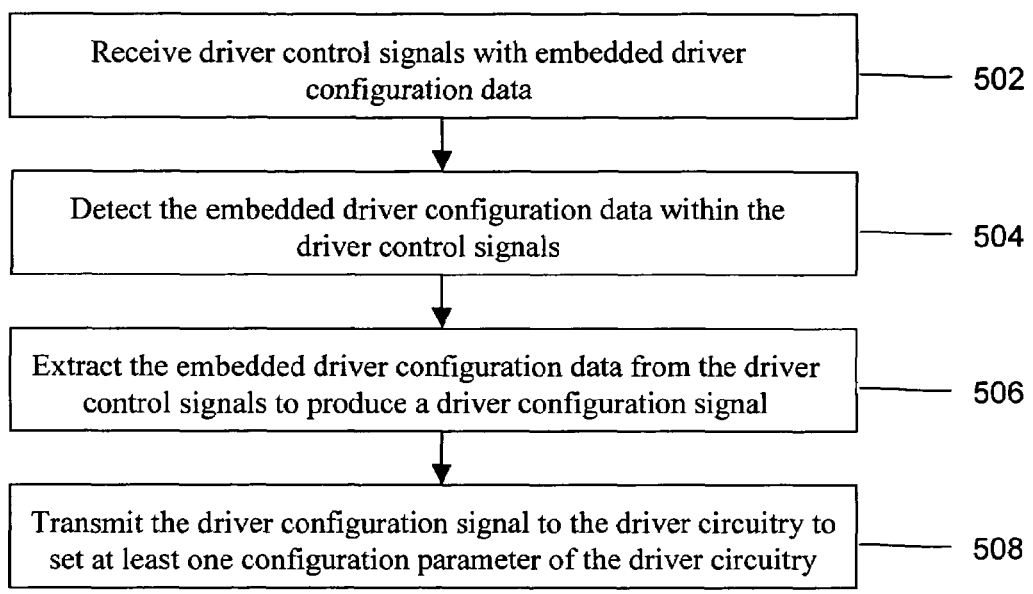
FIG. 5 is a process flow diagram of a method of setting configuration parameters of driver circuitry of an integrated motor device in accordance with an embodiment of the invention.

A method of setting configuration parameters of driver circuitry of an integrated motor device in accordance with an embodiment of the invention is described with reference to a process flow diagram of FIG. 5. At block 502, driver control signals with embedded driver configuration data are received. Next, at block 504, the embedded driver configuration data within the driver control signals is detected. Next, at block 506, the embedded driver configuration data is extracted from the driver control signals to produce a driver configuration signal. Next, at block 508, the driver configuration signal is transmitted to the driver circuitry to set at least one configuration parameter of the driver circuitry.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A motor device comprising:
    a motor;
    driver circuitry connected to said motor to control said motor, said driver circuitry being configurable with respect to driver configuration parameters;
    a plurality of terminals to receive driver control signals with embedded driver configuration data from an external source; and
    a processor connected to at least some of said terminals to receive said driver control signals with said embedded driver configuration data, said processor being configured to detect and extract said embedded driver configuration data in said driver control signals to produce a driver configuration signal using said embedded driver configuration data, said processor being connected to said driver circuitry to transmit said driver configuration signal to said driver circuitry to set at least one of said driver configuration parameters,
    wherein said driver control signals include an enable signal, a direction signal and a pulse signal, wherein said processor is configured to detect said embedded driver configuration data in one of said enable, direction and pulse signals, and wherein said processor is further configured to detect start and end conditions indicated by at least one of said enable, direction and pulse signals to clock in said embedded driver configuration data in one of said enable, direction and pulse signals.

2. The device of claim 1 wherein said driver circuitry includes a translator.

3. The device of claim 1 wherein said driver circuitry is configurable with respect to a driver configuration parameter selected from a group consisting of microstep setting and directional polarity setting.

4. The device of claim 1 wherein said processor is configured to detect said embedded driver configuration data in said direction signal, said processor being further configured to detect start and end conditions indicated by said direction and pulse signals to clock in said embedded driver configuration data in said direction signal.

5. The device of claim 1 wherein said processor is configured to detect said embedded driver configuration data in one of said driver control signals when said motor is disabled by another driver control signal.

6. The device of claim 1 wherein said driver circuitry and said processor are both connected to said terminals so that said processor receives said driver control signals with said embedded configuration data.

7. The device of claim 1 wherein said processor is exclusively connected to said terminals to receive said driver control signals with said embedded driver configuration data.

8. The device of claim 7 wherein said processor is configured to perform functions of a driver translator.

9. The device of claim 1 wherein said processor is configured to generate output driver control signals embedded with driver configuration setting data, said driver configuration setting data including information of configuration settings of said driver circuitry.

10. A method of setting configuration parameters of driver circuitry of a motor device, said method comprising:
    receiving driver control signals with embedded driver configuration data from an external source at terminals of said motor device, said driver control signals including an enable signal, a direction signal and a pulse signal;
    detecting said embedded driver configuration data within one of said enable, direction and pulse signals of said driver control signals received at the terminals, including detecting start and end conditions indicated by at least one of said enable, direction and pulse signals of said driver control signals to clock in said embedded driver configuration data in one of said enable, direction and pulse signals;
    extracting said embedded driver configuration data from said driver control signals to produce a driver configuration signal; and
    transmitting said driver configuration signal to said driver circuitry to set at least one configuration parameter of said driver circuitry.

11. The method of claim 10 wherein said detecting includes detecting said embedded driver configuration data in one of said driver control signals when a motor of the motor device is disabled by another driver control signal.

12. The method of claim 10 wherein said configuration parameter is a driver configuration parameter selected from a group consisting of microstep setting and directional polarity setting.

13. The method of claim 10 wherein said detecting includes detecting said embedded driver configuration data in said direction signal and detecting start and end conditions indicated by said direction and pulse signals to clock in said embedded driver configuration data in said direction signal.

14. The method of claim 10 wherein said receiving includes receiving said driver control signals with said embedded driver configuration data at both said driver circuitry and a processor of said motor device and wherein said transmitting includes transmitting said driver configuration signal from said processor to said driver circuitry.

15. The method of claim 10 wherein said receiving includes exclusively receiving said driver control signals with said embedded driver configuration data at a processor of said motor device and wherein said transmitting includes transmitting said driver configuration signal from said processor to said driver circuitry.

16. The method of claim 10 further comprising generating output driver control signals embedded with driver configuration setting data, said driver configuration setting data including information of configuration settings of said driver circuitry.

* * * * *